(12) United States Patent (10) Patent No.: US 7,441,704 B2
Ross (45) Date of Patent: Oct. 28, 2008

(54) SYSTEM AND METHOD FOR IDENTIFYING A SPATIAL CODE

(75) Inventor: Gary A. Ross, Edinburgh (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/367,974

(22) Filed: Mar. 3, 2006

(65) Prior Publication Data

US 2007/0205284 A1 Sep. 6, 2007

(51) Int. Cl.
*G06K 7/10* (2006.01)
*G06K 7/14* (2006.01)

(52) U.S. Cl. ..................... 235/454; 235/491
(58) Field of Classification Search ............ 235/462.04, 235/462.31, 491, 454; 252/301.16, 301.21, 252/301.33; 283/72
See application file for complete search history.

(56) References Cited

U.S. PATENT DOCUMENTS

| | | | | |
|---|---|---|---|---|
| 5,600,147 | A * | 2/1997 | Jensen | 250/458.1 |
| 6,602,671 | B1 * | 8/2003 | Bawendi et al. | 435/7.1 |
| 2003/0005304 | A1 | 1/2003 | Lawandy et al | |
| 2003/0006170 | A1 | 1/2003 | Lawandy | |
| 2004/0102765 | A1 * | 5/2004 | Koenig | 606/5 |
| 2005/0178841 | A1 * | 8/2005 | Jones et al. | 235/468 |
| 2006/0219961 | A1 | 10/2006 | Ross et al. | |

FOREIGN PATENT DOCUMENTS

| DE | 100 05 835 A1 | 8/2001 |
|---|---|---|
| WO | WO 96/18972 A | 6/1996 |
| WO | WO 2006/053685 A | 5/2006 |

\* cited by examiner

*Primary Examiner*—Daniel St.Cyr
(74) *Attorney, Agent, or Firm*—Christopher P. Ricci; Howard L. Speight

(57) ABSTRACT

A system and method are provided for identifying a one- or multi-dimensional spatial code comprising a plurality of security tags with one or more characteristic emission profiles. The spatial codes are identified on the basis of the combined spatial and spectral information. The system for identifying such spatial codes is comprised of a beam source, a detector, and a processor. The method includes illuminating the code, recording the light emission at a plurality of wavelengths, decoding the spatial information, resolving the spectral profiles, and identifying the code based on the spatial and spectral information. The system and method are applicable to validating a spatial code.

22 Claims, 10 Drawing Sheets

FIG. 3 : EUROPIUM IN AQUEOUS SOLUTION

| EXCITATION WAVELENGTH (nm) | EMISSION WAVELENGTH (nm) | FLUORESCENT INTENSITY |
|---|---|---|
| 395 | 526 | 1.746 |
| 395 | 536 | 2.495 |
| 395 | 556.5 | 8.633 |
| 395 | 592.5 | 85.608 |
| 395 | 618.5 | 30.277 |
| 415 | - | - |
| 465 | 594 | 2.288 |
| 465 | 616.5 | 0.793 |
| 465 | 700.5 | 3.915 |
| 535 | 592 | 1.126 |

# SYSTEM AND METHOD FOR IDENTIFYING A SPATIAL CODE

FIELD OF THE INVENTION

The present invention relates to a system and method for identifying (for example, validating) a code having both spatial and spectral coding components.

BACKGROUND OF THE INVENTION

Security codes (sometimes referred to as markers) are used to authenticate items. For example, bank notes typically include security markers such as watermarks, fluorescent inks, security threads, holograms, kinegrams, and such like. However, with advances in copying technology, it is becoming more difficult to provide security markers, which are not only difficult to counterfeit, but also easily and rapidly detected in situ, and inexpensive. Chemical and biochemical taggants are also used as security markers. However, in many cases such taggants must be removed from the item prior to being analyzed. This is both time-consuming and expensive and precludes use in certain applications.

It would therefore be desirable to provide a system and method for detecting, and identifying, e.g., validating, a security code that has unique spatial and spectral properties that make the code difficult to counterfeit, difficult to validate without a known validation code, and readily adapted to a large number of formats and different codes.

SUMMARY OF THE INVENTION

In one aspect, the invention includes a system for identifying a spatial code applied to an object, where the spatial code includes a plurality of security tags having one or more characteristic emission spectral profiles. The system comprises a beam source operable to illuminate said spatial code, to stimulate light emission from the security tags in the code, simultaneously from the entire code, a detector operable to record the light emission from the security tags, at each of a plurality of wavelengths, when the code is illuminated by said source, to derive spatial and spectral-emission information from the code; and a processor, coupled to the detector, which is operable to (i) decode the spatial code using the spatial information, (ii) resolve the emission spectral profiles from the security tags to derive spectral information therefrom, by resolving the spectrum into a plurality of wavelengths, and (iii) identify the spatial code on the basis of the combined spatial and spectral information from (i) and (ii).

In one embodiment of the system, the detector may include (i) an image detector for recording the spatial image of light emission from the tags in the code, (ii) an optical spectrometer for recording the emission profile of the tags in the code, at each of a plurality of wavelengths, and (iii) a beam splitter for splitting emitted light from the code to both the image detector and the optical spectrometer.

It is also contemplated that the system is to be used in identifying an object whose spatial code has two or more different types of tags, each with a different characteristic excitation wavelength, where the beam source is effective to illuminate the code at each of two or more different excitation wavelengths.

In another embodiment, the system is used in identifying a spatial code having a one-dimensional spatial image, wherein the detector may includes (i) a two-dimensional detector and (ii) a spectral separator for separating light emitted from the code into a plurality of one-dimensional bands, each having a different wavelength, such that the detector records the spatial image of the code at each of a plurality of one-dimensional bands, where each band represents a different emission wavelength. The spectral separator may be, for example, a diffraction grating, a refracting optical element, such as a prism, or a plurality of bandpass filters, each corresponding to one of said bands.

In another embodiment, the beam source in the system may be operable to illuminate the spatial code at each of said different excitation wavelengths. Here the detector may include an image detector operable to record the spatial image of light emission from the tags in the label at each of a plurality of illuminating wavelengths, and the processor may use information recorded at each of the different illuminating wavelengths to resolve the emission spectral profiles from the security tags to derive spectral information therefrom.

In yet another embodiment, the detector in the system may include an image detector operable to record the spatial image of light emission from the tags in the label at each of a plurality of different emission wavelengths. The processor may use information recorded at each of the different emission wavelengths to resolve the emission spectral profiles from the security tags to derive spectral information therefrom.

Where the security tags in the spatial codes are composed of luminophores having long lifetimes, the beam source may be a pulsed beam, and the detector may be operable to record emission from the tags with a time delay, with respect to an illumination pulse, effective to enhance the signal to noise ratio of light emission from the tags. For example, the security tags in the spatial code may each be composed of a host and a rare-earth dopant combination, where the dopant is incorporated in and interacts with the host to provide the distinctive emission profile identifying that tag. The detector here may be operable to record emission from the tags with a time delay, with respect to an excitation laser pulse, of at least about 100 nsec. More specifically, the tags in the spatial code may be selected from the group of lanthanides excepting lanthanum, and the host may be glass or plastic.

Where the system is used for validating a spatial code, the processor may be designed to validate the spatial code only if the spectral information fulfills a predetermined acceptance criterion. In one embodiment of the system, the predetermined acceptance criterion is the presence of spectral information associated with one of the security tags. In another embodiment of the system the predetermined acceptance criterion is a spectral signature associated with one of the security tags.

In another aspect, the invention includes a method for identifying a spatial code applied to an object, where the spatial code includes a plurality of security tags having one or more characteristic emission spectral profiles. The method comprises (a) illuminating the spatial code with a beam source to stimulate light emission from the security tags in the code, simultaneously from the entire code, (b) recording the light emission from the security tags, at a plurality of wavelengths, when the code is illuminated by said source, to derive spatial and spectral emission information therefrom; (c) decoding the spatial code using the spatial information, (d) resolving the emission spectral profile(s) from the security tags to derive spectral information therefrom, by resolving the spectrum into a plurality of wavelengths, and (e) identifying the spatial code on the basis of the combined spatial and spectral information from (c) and (d).

Where the method is used to identify an object whose spatial code has two or more different types of tags, each with a different characteristic excitation wavelength, the illuminating step (a) may include illuminating the code at each of two or more different excitation wavelengths.

In one embodiment, recording step (b) may include (i) recording the spatial image of light emission from the tags in the code with an image detector, (ii) recording the emission profile of the tags in the code with an optical spectrometer and (iii) splitting emitted light from the code to both the image detector and the optical spectrometer with a beam splitter.

In another embodiment, for use in identifying a spatial code having a one-dimensional spatial image, the recording step (b) may include recording the spatial image at each of a plurality of one-dimensional bands on a two-dimensional image detector, using a spectral separator, such as (i) a diffraction grating, (ii) a refracting optical element or (iii) a plurality of bandpass filters, to separate the spatial-code emission into the plurality of one-dimensional bands.

In another embodiment, illuminating step (a) may include illuminating the spatial code at each of a plurality of different excitation wavelengths, recording step (b) may include recording the spatial image of light emission from the tags in the label at each of a plurality of illuminating wavelengths, and resolving step (c) may include using information recorded at each of the different illuminating wavelengths to resolve the emission spectral profiles from the security tags to derive spectral information therefrom.

In another embodiment, recording step (b) may include recording the spatial image of light emission from the tags with an image detector, at each of a plurality of different emission wavelengths, and resolving step (c) may include using information recorded at each of a plurality of different emission wavelengths to resolve the emission spectral profiles from the security tags to derive spectral information therefrom.

For use in identifying an object whose security tags are luminophores having long lifetimes, illuminating step (a) may include illuminating the code with a pulsed beam, and recording step (b) may be operable to record emission from the tags with a time delay, with respect to the illumination pulse, that enhances the signal to noise ratio of light emission from the tags.

In yet another aspect, the method includes validating said spatial code, wherein said identifying step (e) includes identifying the spatial code on the basis of the combined spatial and spectral information from (c) and (d) and comparing the identified code with a known or expected set of one or more codes, thereby validating the code.

These and other and features will becomes more fully apparent when the following detailed description of embodiments of the invention, given only by way of example, is read in conjunction with the accompanying drawings.

BRIEF DESCRIPTION OF THE DRAWINGS

FIG. 3 is a table showing various excitation wavelengths and corresponding emission wavelengths in a security tag composed of a Europium dopant in a borosilicate based glass;

DETAILED DESCRIPTION OF THE INVENTION

I. Definitions

Figure 1:
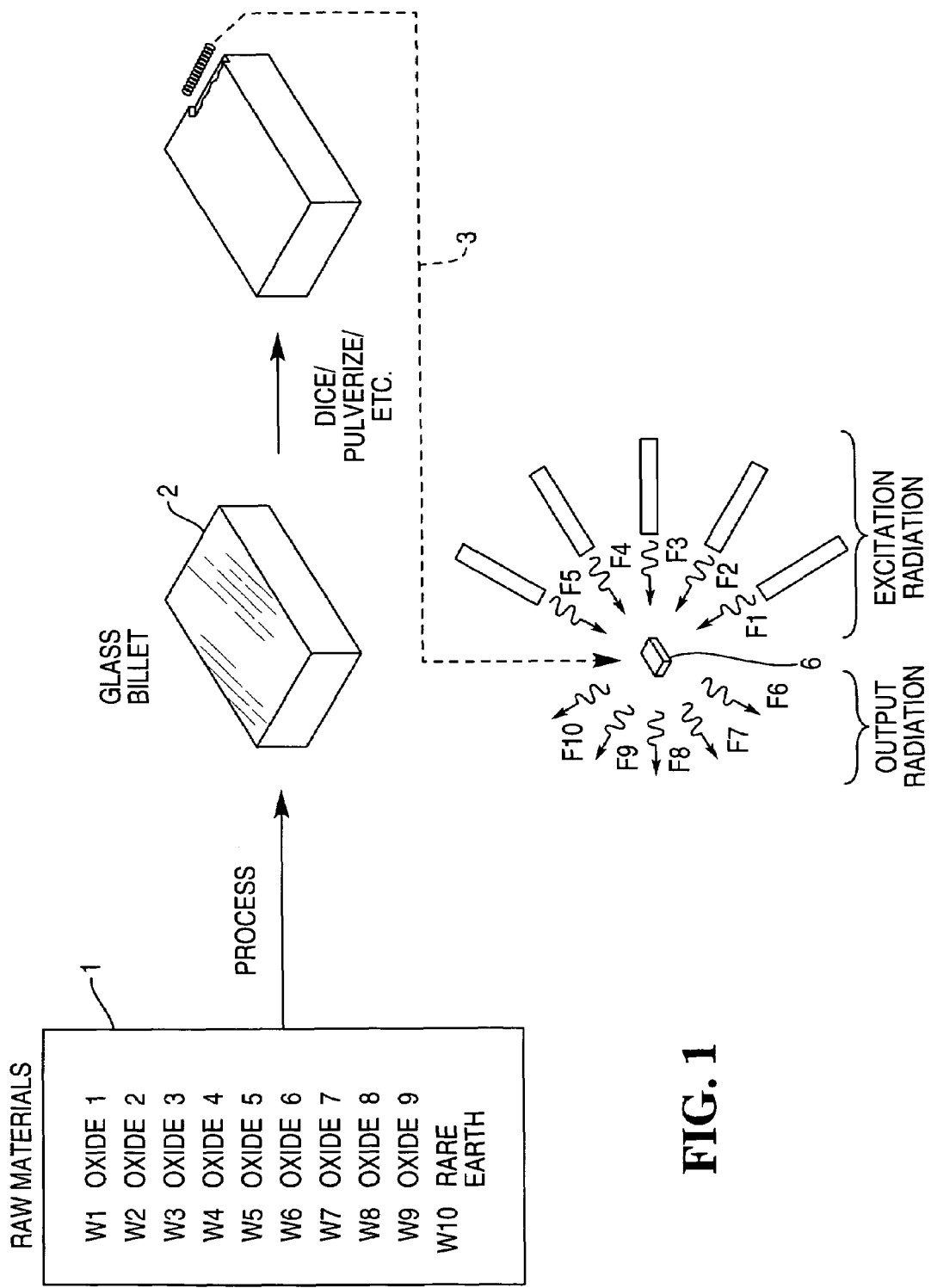
FIG. 1 illustrates steps in the preparation of one type of security tag used in forming spatial codes that can be identified by the system and method of the invention.

The terms below have the following meaning unless indicated otherwise in the specification.

A "security tag" refers to a composition, typically a particle composition, containing one or more energy emitters that emit energy with a characteristic frequency or energy level.

An exemplary security tag in the present invention includes one or more luminophores that emit light with a characteristic peak wavelength or wavelengths, when illuminated by an excitation source having one or more given excitation wavelengths.

A "luminophore" is a compound or composition that undergoes fluorescent or phosphorescent emission at one or more characteristic emission peaks when excited by an illumination source of a given wavelength.

An "emission spectral profile" refers to the set of spectral emission peak wavelengths that characterize a security tag, or set of different security tags, when illuminated by a given excitation wavelength, or when illuminated by a plurality of different excitation wavelengths.

The profile may also include information relating to the peak widths and/or intensities of the emission wavelengths and/or decay rate of each emission frequency.

A "spatial code" refers to a security code having a one-, or multi-dimensional spatial pattern of security tags, where the tags themselves have one or more characteristic emission spectral profiles.

The "spatial image" of a spatial code refers to a one-, or multi-dimensional image of the code at one or more detectable emission wavelengths.

To "decode a spatial image" means to characterize the spatial distribution of emission from a spatial code, typically by comparing the emission image with each of a plurality of stored images;

To "resolve the emission spectral profiles" means to identify some or all of the characteristic emission wavelengths and, optionally, peak widths and/or heights, and/or decay rates associated with a security tag.

"Identifying a security code" refers to identifying a spatial code on the basis of its spatial and spectral profile characteristics, and may include identifying the code on the basis of a match against one of a plurality of pre-stored spatial codes, or validating that the code fulfils a predetermined acceptance criterion, such as the presence of spectral information associated with one of the security tags in the code, or has predefined spatial and spectral-profile characteristics.

II. Security Tags and Spatial Codes

This section describes types of spatial codes that are to be detected by the system and method of embodiments of the invention, and types of security tags that are useful in forming the spatial codes. For purposes of illustration only, the security tags that are disclosed in co-owned U.S. published patent application US 2005/0143249 A1 ('249 application), which is incorporated herein in its entirety, will be described as exemplary security tags having a characteristic emission profile of fluorescent or phosphorescent emission. In general, these tags are composed of a host, such as glass or plastic, and a rare-earth dopant. However, it will be understood that any type of tag having a distinctive spectral emission profile, the ability to be formed into a spatial code, and sufficient stability in terms of total needed lifetime of the code will be suitable. Other useful types of tags, for example, are referenced in the above-cited '249 application.

Block 1 in FIG. 1 illustrates a collection of two types of raw materials used in forming a security tag. (1) a group of oxides, forming the glass host and (2) one or more rare earth elements, forming the dopant in the host. The labels W, such as W, indicate that each raw material, e.g., oxides forming the glass host, is present in a specific weight. Thus, the collective labels W1-W10 indicate a specific composition, by weight, of the raw materials. The raw materials undergo heat treatment and possibly annealing, as indicated by the arrow labeled PROCESS, to produce a glass billet 2. The glass billet 2 is then cut into dice, or pulverized, as indicated by the arrow labeled DICE/PULVERIZE/etc. The resulting particles, such as particle 6 shown in FIG. 1, are the security tags which will be used in forming a spatial code, as described below.

Arrow 3 points to a block which represents one of the dice, or a collection of the powder. In the general case, when the particle 6 is excited by radiation, indicated by frequencies F1 through F5, the particle 6 will emit specific frequencies, indicated by frequencies F6 through F10. The specific emission frequencies, and also properties of those emission frequencies, are unique to the specific glass billet 2. In particular, the characteristic spectral properties of the dopants themselves will be altered in the environment of the host, due to the effect of the host on the outermost electron shells in the dopant material. The properties of the emission radiated frequencies are described below, and include (1) intensity of each emission frequency and (2) decay rate of each emission frequency.

In general, if the relative weights W are altered, different emission frequencies, with different properties, will be detected. Also, if the heat treatment, annealing, or both, of the glass billet 2 are changed, then different emission frequencies, with different properties, can also be detected, even if the compositions of two billets 2 are identical. Therefore, in the general case, the emission frequencies and their properties, obtained from a given set of excitation frequencies, depend on the nature of the oxide (or other host material) and rare earth (dopant) components, the relative weights of the components, the nature of the heat treatment, and the annealing (if any) of the billet 2.

Figure 2:
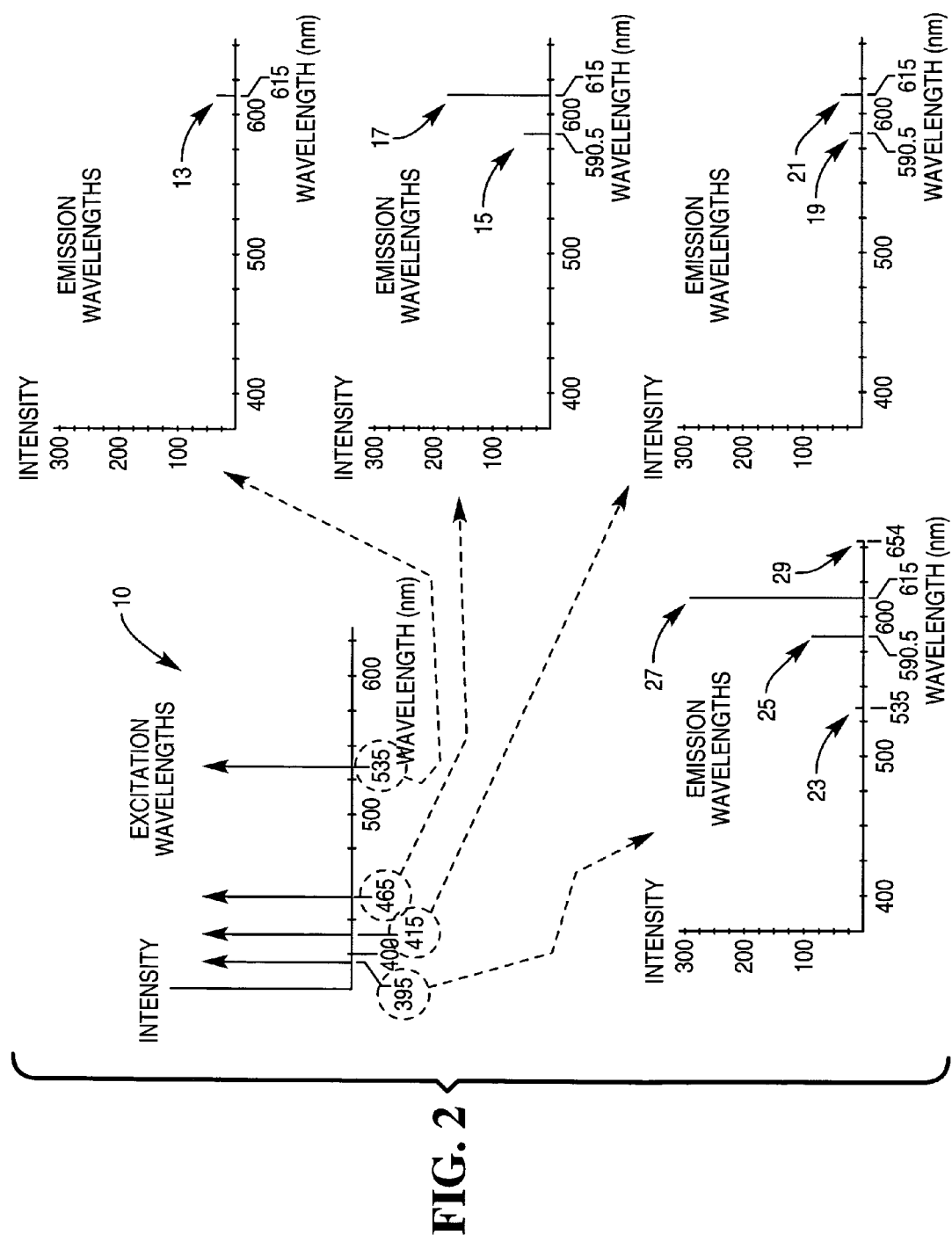
FIG. 2 illustrates four excitation wavelengths 10, and the emission profile produced by each in a security tag described with respect to FIG. 1.

FIG. 2 illustrates a generalized example of the response of a particular glass billet, and is based on FIG. 3, described below. Leader number 10 in the figure indicates four excitation wavelengths, at 395, 415, 465, and 535 nanometers (nm). For the glass billet in question, the 535 nm excitation produces wavelength 13, of relative intensity indicated. The 465 nm excitation produces wavelengths 15 and 17, of relative intensities indicted. The 415 nm excitation produces wavelengths 19 and 21, of relative intensities indicated. The 295 nm excitation produces wavelengths 23, 25, 27, and 29, of relative intensities indicated. FIG. 3 sets forth the relative intensities more precisely, in numerical form.

As indicated above, the security tags may be characterized by a delay in the time interval between excitation and emission, where the excitation light is a pulsed light source, such as a laser or LED source, and also by a decay in the emission intensity over time. One useful property of the presently described security tags, in the context of spatial code detection, is the relatively long lifetime of emission, on the order of at least 100 nsec to 10 μsec or greater, characteristic of phosphorescent emission.

Several significant features which distinguish the security tags of FIG. 1 from earlier-disclosed taggants are the following. One is that, at the present time, it is difficult to reverse-engineer the tag. That is, it is difficult for one to excite the tag as indicated in FIG. 2, detect the output signature, and then fabricate a glass (or other suitable host) and selected dopant or dopants that produces that output signature. A second feature is that the glass systems in question are not crystalline. Glasses, in general, are amorphous solids exhibiting no long range crystalline order; they are not crystals. Thus, an energy level system, if present, is different for the different glasses described herein. A third feature is that some glasses are classified as refractory materials. Dice, or powders, of such glasses can withstand high temperatures. Such glasses are unaffected by temperatures of 400, 500, 700, 1000 degrees F., and higher. This distinguishes them from most, if not all, fluorescent inks and paints, and the surfaces to which the inks and paints are applied.

Figure 4A:
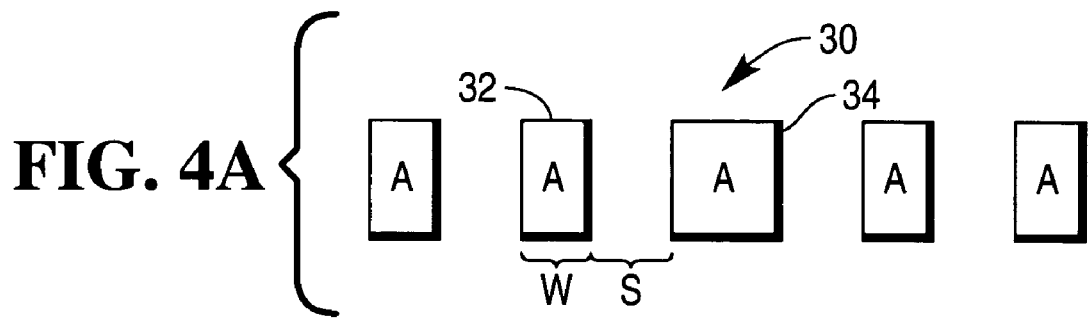
FIGS. 4A-4C illustrate one-dimensional spatial codes having identical spatial configurations, but different security tag compositions.

In forming a spatial code, security tags, such as those described above, are arranged in a defined one-, two-, or three-dimensional pattern that will represent the spatial image of the code. FIG. 4A shows a one-dimensional, barcode-like spatial code 30 formed of a series of bars, such as bars 32, 34, each having a defined width, such as width "w," and each pair of adjacent bars being separated by a defined spacing, such as spacing "s." As indicated, each bar in spatial code 30 contains a single security tag type A, which will therefore define the spectral characteristics or signature of the code as identical to that of security tag A.

Figure 4B:
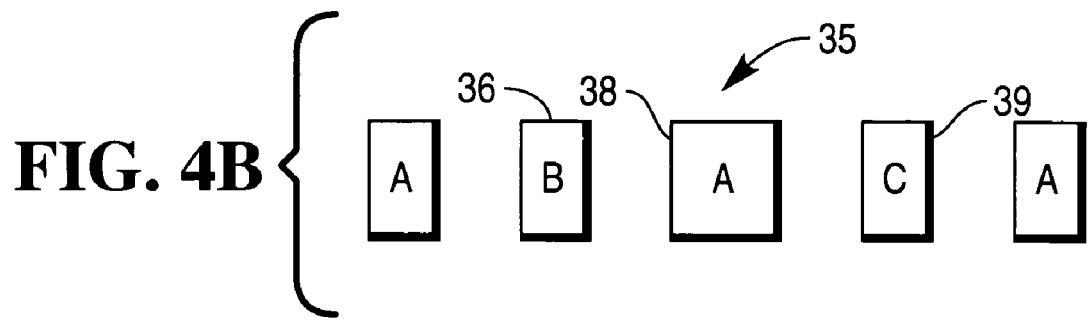

Spatial code 35 in FIG. 4B has a one-dimensional pattern of bars, such as bars 36, 38, identical to the image of code 30. However, different bars in the code such as bars 36, 38, and 39, have different security tags, such as tags B, A, and C, respectively, each tag having a different spectral profile. As will be seen, this type of code can be interrogated in a variety of ways for code identification. In one approach, the code is illuminated with a broad spectrum illumination source or simultaneously with individual light sources corresponding to the excitation wavelengths of each of the three different tags 103. The different bars in the code will each have distinctive spectral peaks characteristic of that tag, and can be identified by these characteristic emission peaks. In a second approach, the code is successively illuminated with a selected excitation frequency, and the pattern of emission at each frequency recorded. It will be appreciated that this code allows for an exponential expansion of the number of distinct codes that can be created over the one-tag code described with respect to FIG. 4A.

Figure 4C:
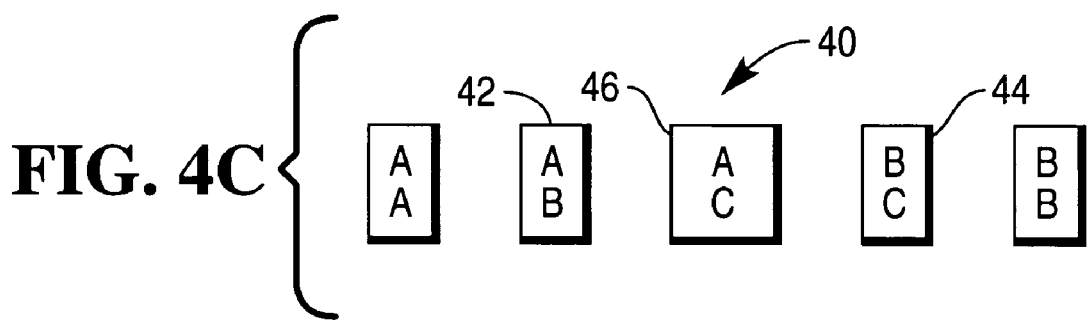

The code indicated at 40 in FIG. 4C has the same one-dimensional pattern of bars, such as bars 42, 44, and 46, as the previous two codes, but in this embodiment, each bar may contain multiple security tags, such as tags A and B in bar 42, A and C in bar 46, and B and C in bar 44. This code can be interrogated, for code identification, substantially as described above for code 35. When illuminated simultaneously with a plurality of excitation wavelengths, each bar will have a spectral profile corresponding to the characteristic spectral profiles of its individual security-tag components, where the relative spectral peak heights can be varied according to the relative amounts of tags in each bar. Thus this code significantly expands the variation in code in terms of number of spectral peaks and relative peak heights associated with each bar in the code.

Figure 5A:
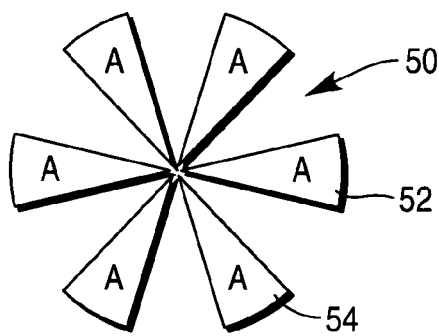
FIGS. 5A and 5B illustrate different two-dimensional spatial codes, the first having a single type of security tag (5A), and the second, three different types of security tags (5B)

FIG. 5A shows a two-dimensional spatial code 50 of a type that is suitable for decoding, and where the spatial information resides in the size and angular distribution of wedge-shaped elements, such as elements 52, 54. In this embodiment, each element is composed of a single type of security tag (tag type A), as indicated.

Figure 5B:
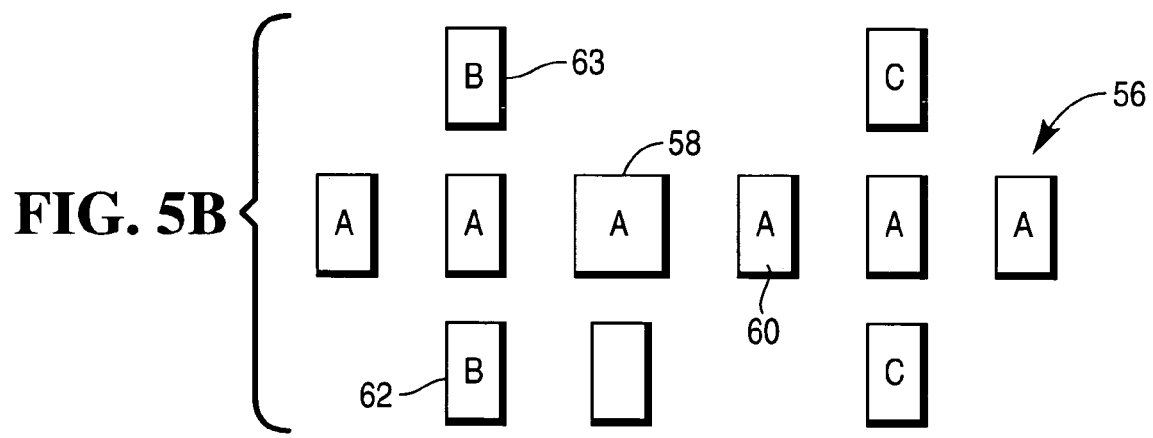

A two-dimensional code 56 illustrated in FIG. 5B is composed of orthogonal one-dimensional arrays of bars, such as the array containing bars 58, 60, and the orthogonal array containing bars 62, 63. As indicated, different one-dimensional components of the code may have a single type of security tags or multiple types of security tags, with concomitant advantages for total coding capability.

The codes may be applied to security objects, such as paper currency, legal and other valuable papers, retail goods, such as clothing, containers, ballistic devices, and the like, according to known methods.

III. System and Method

Figure 6:
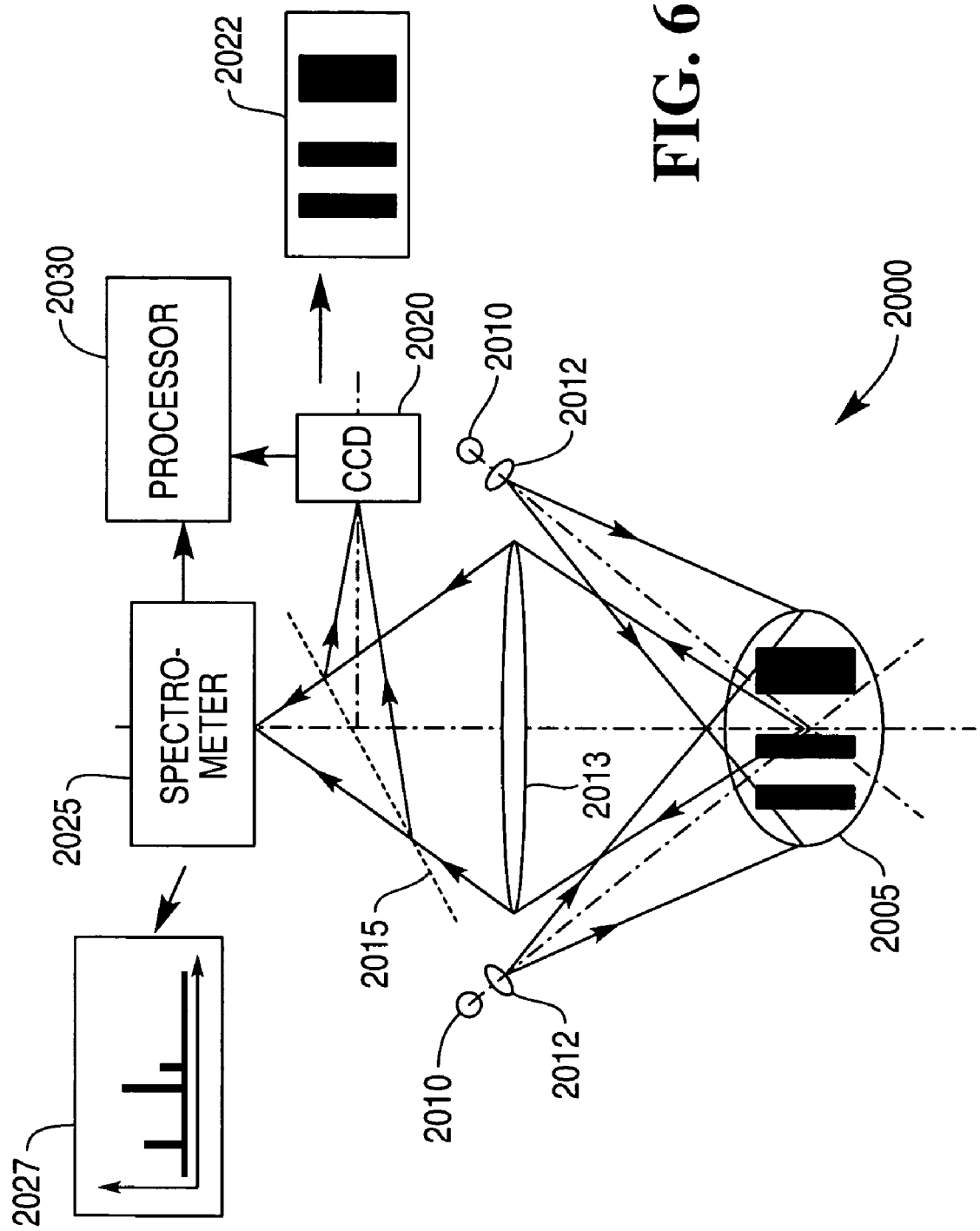
FIG. 6. illustrates a system for detecting a spatial code having one or more characteristic emission spectral profiles, in accordance with one general embodiment of the invention.

FIG. 6 illustrates a system 2000 for identifying, e.g., validating, a spatial code of the type described above, constructed in accordance with one embodiment of the invention. Although the code could be used for either the spatial pattern or the spectral properties of the security tag(s), this embodiment contemplates using the combination of the two types of information to make the code either that much harder to counterfeit, or that much more information-rich. The system 2000 of FIG. 6 includes a pair of beam sources 2010. The beam source should illuminate the entire area occupied by the spatial code, so that the code can be interrogated simultaneously. Optical lenses 2012 may be useful to create a beam having the appropriate size for illuminating the spatial code. The beam source 2010 should also provide the necessary wavelength(s) to excite all the security tags anticipated to be present in the code. Each beam source in the system may be a white light source, or it may be a multi-wavelength lamp or light source, or it may be a source of a single dominant wavelength, which can be different for each light source. Examples include mercury arc lamps, LEDs, diode lasers, or other light sources as are known in the art. A white light may be convenient for maximum flexibility in the deployment of the system.

Also included in the system is a detector comprising a beam splitter 2015, a two-dimensional image detector 2020, a spectrophotometer 2025, and a processor 2030. In operation, an article bearing a spatial code 2005 is placed within the "interrogation zone" of the system such that the entire code is illuminated by the beam source 2010. The beam excites the luminophores that define the spatial code on the article, causing light to be emitted from the security tags. The light is collected by a lens 2013 and sent towards a beam splitter 2015. The beam splitter may be, for example, a partially reflective mirror. The splitter operates to send a portion of the emitted image to the image detector 2020, and a portion of the emitted image to a spectrophotometer 2025. Other optical components may be added to the various optical paths as needed for focusing, adjusting the beam size, rejecting stray light, etc.

In this embodiment, the image detector 2020 is a CCD detector with a two-dimensional detector array; and the spectrophotometer 2025 is a diode-array detector that is capable of recording the spectrum of emitted light in one step, i.e. without requiring scanning of some variable. Both the image detector and spectrophotometer are operably connected to a processor 2030. The processor is also connected to the beam source.

Processor 2030 functions to (i) decode the spatial code, such as seen at 2022, using the spatial information, (ii) resolve the emission spectral profiles, such as the profile seen at 2027, from the security tags to derive spectral information therefrom, by resolving the spectrum into a plurality of wavelengths, and (iii) identify the spatial code on the basis of the combined spatial and spectral information from (i) and (ii). To decode the spatial information, the processor may record the spatial image received, and compare this image with each of a number of pre-stored images corresponding to different code images. To resolve the spectral profile, the processor may record the peak wavelengths, and optionally, the (absolute or relative) peak heights and/or the peak widths and/or decay times using the spectrometer, then match these characteristics with the spectral profiles of known, pre-recorded security tags, to identify the one or more security tags contained in the code. Once both the identity of the code image and spectral profile(s) are known, the processor can make an identification of the code based on the combined information. Typically, the processor will contain predetermined spatial and spectral information that will allow the processor to validate the code as having or meeting predetermined spatial-code and spectral-profile characteristics.

The processor is also operatively connected to the light sources, to control the illumination times and sequences of the sources. For example, where it is desired to interrogate the spatial code at two different excitation frequencies, the processor will activate one source, to allow collection of emission light by the image detector and spectrometer at that excitation frequency, then switch to the second source to allow emission collection from the code at the new frequency. In addition, the processor will control the timing between a light source pulse and the time of emission detection.

Further, where the security code is one that has a relatively long luminescense lifetime, the detector may be controlled by the processor to record emitted light at a timed delay, e.g., 100 nsec to 10 msec, following the illumination pulse, Using this approach, the effect of background fluorescence from the code will be minimized, enhancing the signal-to-noise ratio of the recorded signal. The processor delay element is discussed below with respect to FIG. 10.

Figure 7:
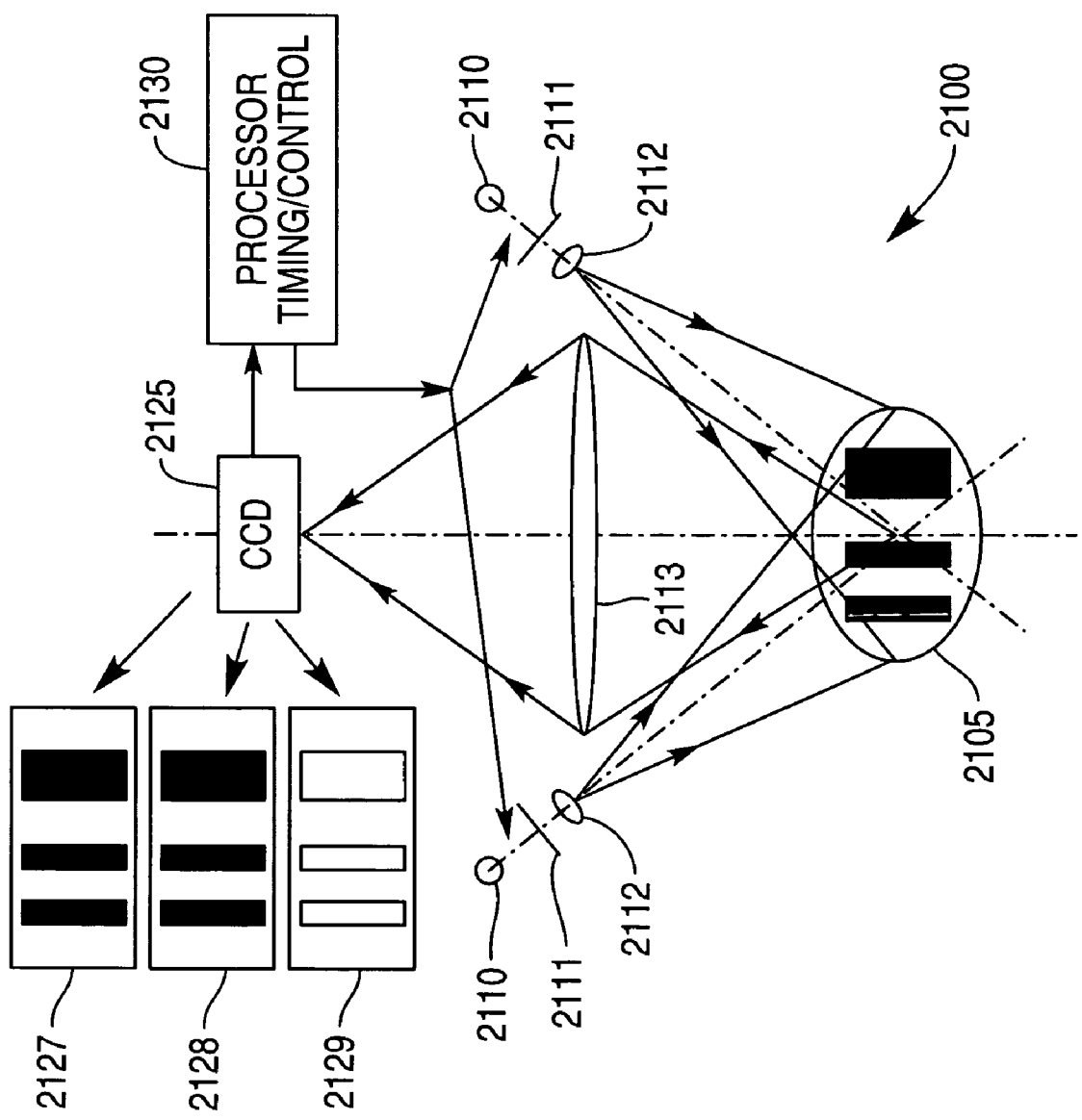
FIG. 7 illustrates a system for detecting a spatial code having one or more characteristic emission spectral profiles, in accordance with a second general embodiment of the invention.

FIG. 7 illustrates a system 2100 for detecting a spatial code, such as seen at 2105, of the type described above, constructed in accordance with a second general embodiment of the invention. The system of FIG. 7 includes a pair of beam sources 2110, like beam source 2010 described above, and an optical lens 2112 for projecting an illumination beam over the entire spatial code. In addition, each beam source may include a bandpass filter 2111 for projecting a desired wavelength beam onto the code. The detector in system 2100 includes a lens 2113 for focusing emitted light from the code onto an image detector, such as a two-dimensional CCD 2125.

As above, a processor 2130 in the system is operatively connected to the light source and detector, and functions to (i) decode the spatial code using the spatial information, (ii)

resolve the emission spectral profiles from the security tags to derive spectral information therefrom, by resolving the spectrum into a plurality of wavelengths, and (iii) identify the spatial code on the basis of the combined spatial and spectral information from (i) and (ii). The image decoding is carried out as described above. To resolve the spectral profile, the processor may record the image of emitted light at each of a plurality of different excitation wavelengths, giving rise to different emission patterns in the code. This is indicated in the figure, which shows, at 2127, 2128, and 2129, spatial images of the spatial code collected at three different emission wavelengths, in response to illumination at different wavelengths. To decode the spectral information, the shape and intensity of the image from the CCD detector may be compared with pre-stored images corresponding to the code image at each of a plurality of illumination wavelengths. As can be appreciated, the processor in this embodiment may function to process the spatial and spectral information from a single set of pre-stored images.

Also as above, the processor may control the timing of the illumination pulse and record time, to enhance the signal-to-noise ratio of the system by reducing the amount of fluorescence background that will be detected.

Figure 8:
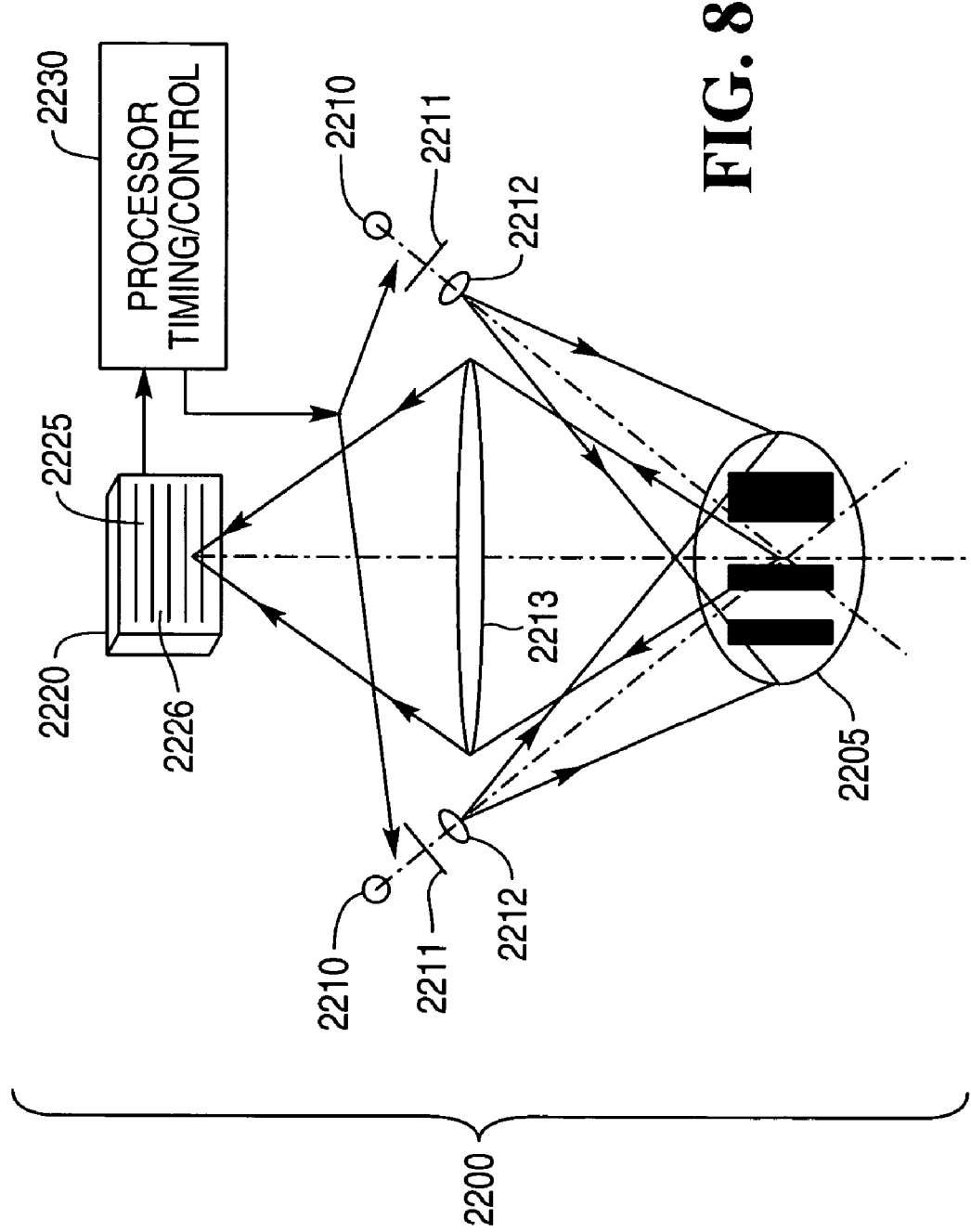
FIG. 8. illustrates a system for detecting a one-dimensional spatial code having one or more characteristic emission spectral profiles, in accordance with a third general embodiment of the invention.

FIG. 8 illustrates a system 2200 for detecting a spatial code of the type described above, constructed in accordance with a third general embodiment of the invention. In particular, and as will be described with respect to FIGS. 9A and 9B, this embodiment is designed for detecting a linear or one-dimensional code, such as that illustrated in FIGS. 4A-4C.

The system of FIG. 8 includes a pair of beam sources 2210, like beam source 2010 described above, and an optical lens 2212 for projecting an illumination beam over the entire spatial code, indicated at 2205. Each beam source 2210 may additionally include a bandpass filter 2211 for projecting a desired wavelength beam onto the code. System 2200 includes a lens 2213 for focusing emitted light from the code 2205 onto a detector arrangement 2250. The detector arrangement 2250 includes a two-dimensional CCD 2220 and an optical separator in the form of either a filter plate 2222 (FIG. 9A) or a prism 2235 (FIG. 9B).

Figure 9A:
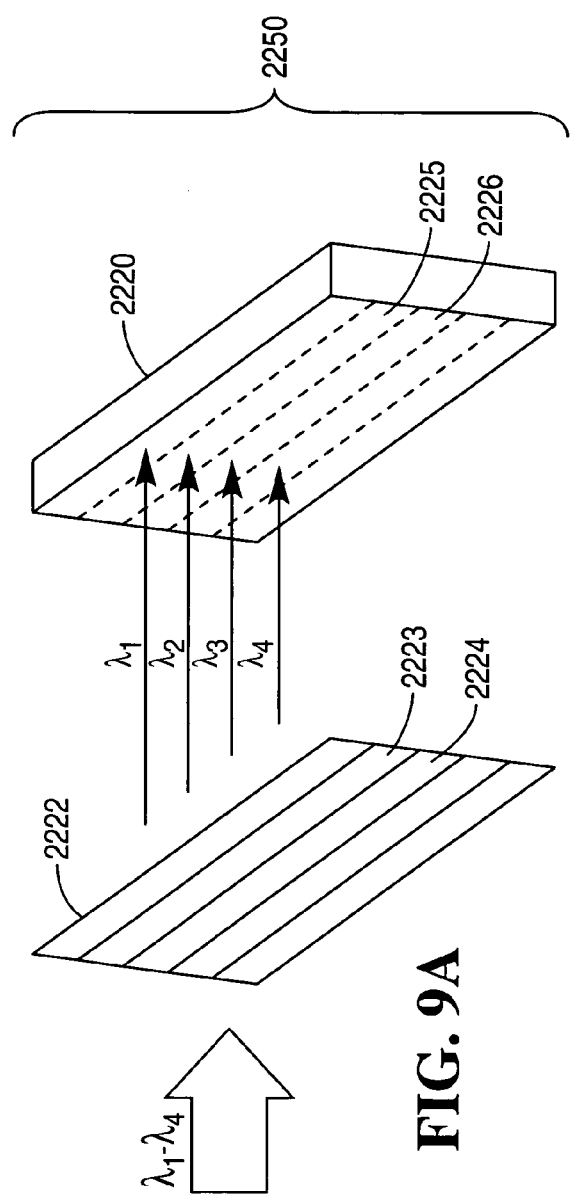
FIGS. 9A and 9B illustrate different frequency-separator configurations useful in the embodiment of the system illustrated in FIG. 8.
Figure 9B:
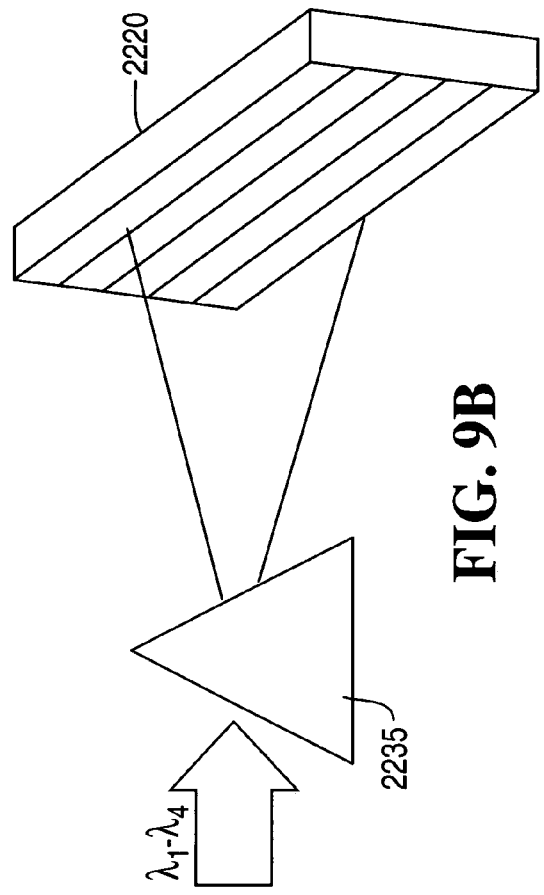

FIGS. 9A and 9B illustrate two different embodiments of the detector in FIG. 8. In both cases, the detector is designed to separate the emitted light pattern from a one-dimensional code into a plurality of one-dimensional image bands, each representing a different spectral frequency. These different bands, in turn, are projected onto corresponding one-dimensional band regions of the two-dimensional CCD 2220. In the detector arrangement 2250 shown in FIG. 9A, a filter plate 2222 containing a series of linear bandpass filters, such as filters 2223, 2224, functions to separate the emission image into multiple, e.g., 5-10 different wavelength bands which are recorded at corresponding bands, such as bands 2225, 2226, of the detector 2220. The filter plate is placed against or close to light-sensitive elements in the CCD 2220.

In the embodiment illustrated in FIG. 9B, the detector arrangement includes a prism 2235 (instead of the filter plate 2222) placed adjacent the light-sensitive elements in the CCD 2220. The prism 2235 diffracts the light emission from the spatial code 2205 into a plurality of spectral bands that are then projected to corresponding one-dimensional bands of the CCD 2220. In a similar way as for the FIG. 9A embodiment, the array bands are fed to the system processor 2230, where they are recorded and processed as separate images at different spectral wavelengths. Another, although somewhat similar, embodiment employs a diffraction grating placed between the code and CCD to diffract the emitted light into a series of one-dimensional bands of different wavelength.

As in the two embodiments described with respect to FIGS. 6 and 7, the processor 2230 in system 2200 is operatively connected to the light source and detector, and functions to (i) decode the spatial code using the spatial information, (ii) resolve the emission spectral profiles from the security tags to derive spectral information therefrom, by resolving the spectrum into a plurality of wavelengths, and (iii) identify the spatial code on the basis of the combined spatial and spectral information from (i) and (ii). The image decoding and spectral analysis is carried out as described above with respect to system 2100. More specifically, the processor may store, for each possible code to be detected or validated, a two-dimensional image of all possible codes, where each image includes the plurality of one-dimensional images seen at each of a plurality of different emission wavelengths.

Figure 10:
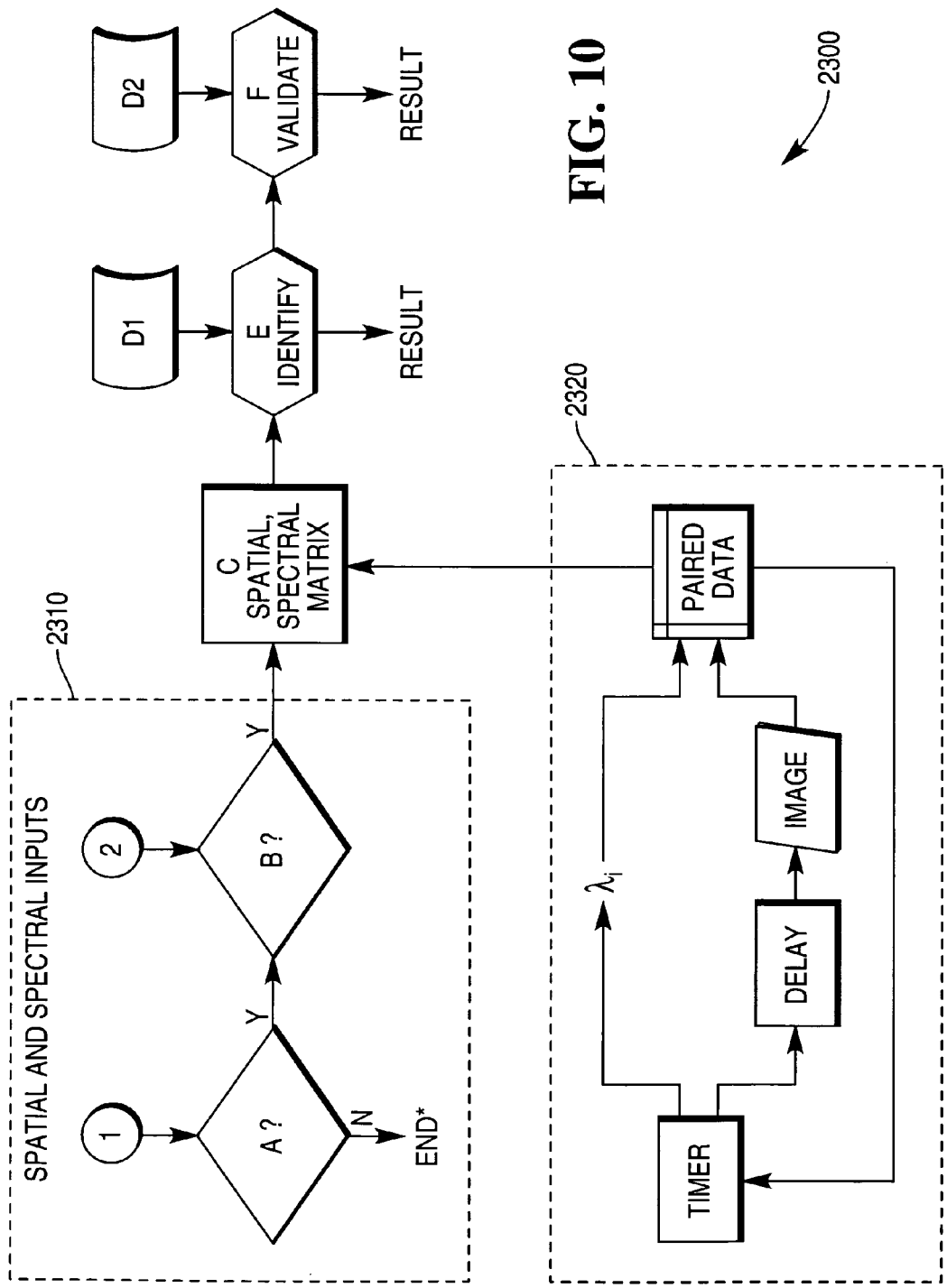
FIG. 10 is flow chart illustrating a methodology applied by a processor for identifying a spatial code, according to aspects of the invention.

FIG. 10 shows components of the processor in the system, and operative connections among them. Box 2310 represent spatial and spectral inputs to the processor. Circle one in the box represents the spatial input from a code when illuminated by an excitation beam. If no spatial image is observed in the detector CCD (diamond A), the processor operation terminates or the beam source is switched to another illumination wavelength. If a spatial image is observed, the image is recorded and the processor resolves the spectral profile of the code (diamond B) based on (i) spectral information from a spectrometer or (ii) spatial image intensity and patterns at different emission frequencies, as described above.

Box 2320 illustrates the processor timing function, which controls the timing of the beam-source pulse in relation to the recording time. The box shows a beam pulse $\lambda_i$ controlled by a timer, which also controls the recording of the code image, after a given delay. As noted above, where the code being interrogated is composed of security tags formed of rare-earth metals in a glass or plastic host, the luminescent delay from the tags is on the order of 1 μsec or more, whereas fluorescent events tend to decay over a period of less than 100 ns. Therefore, introducing a time delay of at least 100 nsec, and preferably 1-10 μsec is effective to eliminate most background fluorescence induced by the illuminated event.

The spatial and spectral information from the above is compared in a spatial-spectral matrix (box C) which stores, for each of a plurality of predetermined spatial codes, the spatial image and spectral profile characteristics of those codes. As described above, the spatial image and spectral-profile information obtained from the code emission is compared with the stored information to identify, e.g., validate, the code as identical to one of the stored codes. Input D1 in the figures represents a user instruction to identify a given code (box E). With this instruction the processor outputs the identity of the code being interrogated. Input D1 represents user input requesting validation of the code being interrogated, as one of a plurality of "valid" codes. In this mode, the processor confirms that the code being interrogated has predetermined spatial and/or spectral-profile characteristics associated with a valid code.

It will be appreciated that the system just described may be readily constructed as part of a hand-held device whose "interrogating zone" can be scanned over a spatial code to be identified or validated. In particular, since the entire code is illuminated simultaneously, and emission is recorded simultaneously from the entire code, a code can be easily and quickly interrogated simply by moving the interrogating zone of a hand-held device over a spatial code. However, where it is convenient to scan codes at fixed relative positions, e.g., for scanning bank notes, the system can be readily designed and operated as a fixed unit positioned for reading objects carried through its interrogation zone.

In accordance with another aspect of the invention, there is provided a method for identifying, e.g., validating, a spatial code of the type described in Section II above. The method involves first illuminating the spatial code with a beam source, to stimulate light emission from the security tags in the code, simultaneously from the entire code. The light emission from the security tags is then recorded or detected, at a plurality of wavelengths, to derive spatial and spectral-emission information therefrom. The spatial image of the code is decoded using the recorded spatial information, and the spectral-emission information is used to resolve spectral profile(s) from the security tags, by resolving the spectrum into a plurality of wavelengths. The spatial codes are then identified on the basis of the combined spatial and spectral information.

From the foregoing, it will be appreciated how various objects and features of the invention are met. Encoding information in a spatial code having both spatial and spectral-profile information allows a virtually unlimited number of codes to be designed with relatively few different types of security tags and/or with relatively simple spatial patterns. The system of the invention can be constructed either as a hand-held or fixed-position unit. Where the security tags are luminophores of the type described in Section II above, the system can be operated in a mode that enhances signal-to-noise ratio.

A skilled person will appreciate that variations of the disclosed arrangements are possible without departing from the invention. For example, whilst only a few rare earth ions have been specifically described, it will be appreciated that there is a wide range of rare earth ions that could be used. The number of permutations available is therefore greatly enhanced. In addition, whilst some rare earth ions emit in the UV and IR ranges, it is preferred for some applications that both the excitation radiation and the emitted radiation are within the visible range, which is within a wavelength range that is visible to the unaided human eye. Furthermore, whereas only several optical layouts and detectors and processing methods have been explicitly described, it should also be appreciated that other variations of optical detection technologies and methods can be equally applied in the disclosed systems and methods. Accordingly, the above description of a specific embodiment is made by way of example only and not for the purposes of limitation. It will be clear to the skilled person that minor modifications may be made without significant changes to the operation described.

What is claimed is:

1. A system for identifying a spatial code applied to an object, where the spatial code includes a plurality of security tags having one or more characteristic emission spectral profiles, the system comprising:
   a beam source operable to illuminate said spatial code, to stimulate light emission from the security tags in the code, simultaneously from the entire code,
   a detector operable to record the light emission from the security tags, at each of a plurality of wavelengths, when the code is illuminated by said source, the detector further comprising (a) an image detector for recording a spatial image of light emission from the tags in the code, (b) an optical spectrometer for recording an emission profile of the tags in the code, and (c) a beam splitter for splitting emitted light from the code to both the image detector and the optical spectrometer; and
   a processor, coupled to the detector and the beam source, which is operable to (i) cause the beam source to illuminate said spatial code in a sequence of a plurality of time-spaced illuminations, the beam source illuminating the spatial code with a different set of illumination wavelengths for each of the plurality of time-spaced illuminations; (ii) cause the detector to record a spatial image of light emissions from the security tags in the code for each of the plurality of time-spaced illuminations; (iii) cause the optical spectrometer to record the emission profile from the security tags for each of the plurality of time-spaced illuminations; (iv) decode a time-spaced spatial code for each of the plurality of time-spaced illuminations using the spatial image of light emissions for each of the plurality of time-spaced illuminations; (v) resolve the emission spectral profiles from the security tags for each of the plurality of time-spaced illuminations to derive spectral information for each of the plurality of time-spaced illuminations therefrom, by resolving the spectrum into a plurality of wavelengths; and (vi) identify the spatial code on the basis of the combined time-spaced spatial codes and time-spaced spectral information.

2. The system of claim 1, for use in identifying an object whose spatial code has two or more different types of tags, each with a different characteristic excitation wavelength, and said beam source is effective, under control of the processor, to illuminate the code for a first time period at a first excitation frequency but not at a second excitation frequency, and for a second time period at the second excitation frequency but not at the first excitation frequency, where the first and second excitation frequencies correspond to excitation wavelengths of two different types of tags.

3. The system of claim 1, for use in identifying a spatial code having a one-dimensional spatial image, wherein the detector includes (i) a two-dimensional detector and (ii) a spectral separator for separating light emitted from the code into a plurality of one-dimensional bands, each having a different wavelength, such that the detector records the spatial image of the code at each of a plurality of one-dimensional bands, where each band is at a different emission wavelength.

4. The system of claim 3, wherein the spectral separator is selected from one of (i) a diffraction grating, (ii) a refracting optical element and (iii) a plurality of bandpass filters, each corresponding to one of said bands.

5. The system of claim 1, wherein said beam source is operable to illuminate the spatial code at each of said different excitation wavelengths, said detector includes an image detector operable to record the spatial image of light emission from the tags in a label at each of a plurality of illuminating wavelengths, and said processor uses information recorded at each of the illuminating wavelengths to resolve the emission spectral profiles from the security tags to derive spectral information therefrom.

6. The system of claim 1, wherein said detector includes an image detector operable to record the spatial image of light emission from the tags in a label at each of a plurality of different emission wavelengths, and said processor uses information recorded at each of the different emission wavelengths to resolve the emission spectral profiles from the security tags to derive spectral information therefrom.

7. The system of claim 1, for use in identifying an object whose security tags are luminophores, wherein the processor is also operatively connected to the beam source to deliver illumination pulses by controlling illumination times of the beam source, and said detector is operable to record emission from the tags with a time delay, with respect to an illumination pulse, that enhances the signal to noise ratio of light emission from the tags.

8. The system of claim 7, wherein the tags in the spatial code are each composed of a host and a rare-earth dopant combination, where the dopant is incorporated in and interacts with the host to provide the distinctive emission profile identifying that tag, and the detector is operable to record emission from the tags with a time delay, with respect to an excitation laser pulse, of at least about 100 nanoseconds.

9. The system of claim 8, wherein the tags in the spatial code are selected from the group of lanthanides excepting lanthanum, the host is selected from the group of glass and plastic, and the detector is operable to record emission from the tags with a time delay, with respect to an excitation laser pulse, of 100 nanoseconds.

10. The system of claim 1, for use in validating said spatial code, wherein said processor operates, in carrying out step (iii), to validate the spatial code only if the spectral information fulfils a predetermined acceptance criterion.

11. The system of claim 10, wherein the predetermined acceptance criterion is the presence of spectral information associated with one of the security tags.

12. The system of claim 10, wherein the predetermined acceptance criterion is a spectral signature associated with one of the security tags.

13. A method for identifying a spatial code applied to an object, where the spatial code includes a plurality of security tags having one or more characteristic emission spectral profiles, the method comprising:
(a) illuminating said spatial code with a beam source in a sequence of a plurality of time-spaced illuminations, each of the plurality of time-spaced illuminations having a different set of illumination wavelengths, to stimulate light emission from the security tags in the code, simultaneously from the entire code;
(b) recording a light emission from the security tags for each of the plurality of time-spaced illuminations, including (i) recording a spatial image of light emission from the tags in the code with an image detector for each of the plurality of time-spaced illuminations to derive spatial information for each of the plurality of time-spaced illuminations therefrom, (ii) recording the emission profile of the tags in the code with an optical spectrometer for each of the plurality of time-spaced illuminations to derive spectral-emission information for each of the plurality of time-spaced illuminations therefrom, and (iii) splitting emitted light from the code to both the image detector and the optical spectrometer with a beam splitter;
(c) decoding a spatial code for each of the plurality of time-spaced illuminations using the spatial information for each of the plurality of time-spaced illuminations;
(d) resolving the emission spectral profile(s) from the security tags for each of the plurality of time-spaced illuminations to derive spectral information for each of the plurality of time-spaced illuminations therefrom, by resolving the spectrum into a plurality of wavelengths; and
(e) identifying the spatial code on the basis of the combined time-spaced spatial codes and time-spaced spectral information from (c) and (d).

14. The method of claim 13, for use in identifying an object whose spatial code has two or more different types of tags, each with a different characteristic excitation wavelength, and said illuminating step (a) includes illuminating the code at each of two or more different excitation wavelengths.

15. The method of claim 13, for use in identifying a spatial code having a one-dimensional spatial image, wherein recording step (b) includes recording the spatial image at each of a plurality of one-dimensional bands on a two-dimensional image detector.

16. The method of claim 15, wherein said recording step (b) includes separating the spatial image into a plurality of different-wavelength bands, using a spectral separator selected from one of (i) a diffraction grating, (ii) a refracting optical element and (iii) a plurality of bandpass filters.

17. The method of claim 13, wherein said illuminating step (a) includes illuminating the spatial code at each of a plurality of different excitation wavelengths, said recording step (b) includes recording the spatial image of light emission from the tags in a label at each of a plurality of illuminating wavelengths, and said resolving step (c) includes using information recorded at each of the different illuminating wavelengths to resolve the emission spectral profiles from the security tags to derive spectral information therefrom.

18. The method of claim 13, wherein recording step (b) includes recording the spatial image of light emission from the tags with an image detector, at each of a plurality of different emission wavelengths, and resolving step (c) includes using information recorded at each of a plurality of different emission wavelengths to resolve the emission spectral profiles from the security tags to derive spectral information therefrom.

19. The method of claim 13, for use in identifying an object whose security tags are luminophores, wherein said illuminating step (a) includes illuminating the code with a pulsed beam, and said recording step (b) is operable to record emission from the tags with a time delay, with respect to the illumination pulse, that enhances the signal to noise ratio of light emission from the tags.

20. The method of claim 19, wherein the tags in the spatial code are each composed of a host and a rare-earth dopant combination, where the dopant is incorporated in and interacts with the host to provide the distinctive emission profile identifying that tag, and the detector is operable to record emission from the tags with a time delay, with respect to an excitation laser pulse, of at least about 100 nanoseconds.

21. The method of claim 20, wherein the tags in the spatial code are selected from the group of lanthanides excepting lanthanum, the host is selected from the group of glass and plastic, and recording step (b) is operable to record emission from the tags with a time delay, with respect to an illumination pulse, of 100 nanoseconds.

22. The method of claim 13, for use in validating said spatial code, wherein identifying step (e) includes identifying the spatial code on the basis of the combined spatial and spectral information from (c) and (d), and comparing the identified code with a known or expected set of one or more codes.

* * * * *